April 25, 1967 W. L. HUCKE III 3,316,455

FLAT-PACK CIRCUIT MODULES ASSEMBLY

Filed Aug. 31, 1965 2 Sheets-Sheet 1

WITNESSES

Theodore F. Wrobel

James F. Young

INVENTOR

William L. Hucke, III

BY

W. F. Straitiff 3,316,455

FLAT-PACK CIRCUIT MODULES ASSEMBLY

William L. Hucke III, Baltimore, Md., assignor to Westinghouse Electric Corporation, Pittsburgh, Pa., a corporation of Pennsylvania Filed Aug. 31, 1965, Ser. No. 484,033
8 Claims. (Cl. 317—100)

The present invention relates to assemblies of flat-pack circuit modules and more particularly to characteristics of packaging such assemblies so as to afford a high degree of compaction and facilitation in fabrication.

With increasing emphasis on miniaturization of electronic equipment, as with the advent of use of microcircuit modules of the flat-pack configuration, for example, it becomes increasingly more important to provide for assemblage of such modules in a manner which facilitates electrical interconnection between module leads, connection to output pins, and which results in a compact, relatively inexpensive package of such interconnected circuit modules. It is also secondarily important that the assembly be adapted for inclusion of discrete miniature circuit elements. Accordingly, it becomes a prime object of the present invention to provide such construction and technique.

According to general features of the present invention, the novel assembly comprises a pre-formed base of electrical insulating material which includes means defining a linear array of preformed locating slots interleaved with a plurality of raised shoulders or lands between the slots.

Mounted on a chosen number of the lands of the base member are respective ones of the microcircuit flat-pack modules to be incorporated in the ultimate assembly. The lands are relatively narrow and accept a thin side edge of the flat-pack modules which are bonded in place so that their electrical leads extend oppositely in a direction parallel to the direction of extension of the lands and in spaced-apart array in a direction perpendicular to the direction of extension of the lands.

Interposed between the flat-pack circuit modules are a plurality of flat-pack conductor-containing elements which are edgewise-mounted in respective slots between the lands on which the modules are edgewise-mounted. Each of the flat-pack conductor-containing elements has a plurality of feed-through conductors disposed therein which extend parallel to the direction of extension of the slots in which they are mounted and in spaced-apart linear array in a direction perpendicular to such direction of extension of the slots. Each of such feed-through conductors has leads which extend outwardly from opposite parallel side edges of the conductor-containing element and are preferably so spaced apart as to be in alignment with the leads of the circuit modules between which such conductor-containing elements are interposed. The conductor-containing elements also include a number of output conductors which have lead portions extending outwardly from the same edges as the leads of the feed-through conductors, as well as including output pins extending at right angles outwardly through a mutually perpendicular end edge of the elements and through respective openings in the bottom of the locating slots in the base member.

Interconnection between leads of the circuit modules at opposite ends thereof is established by lead-connecting conductor elements disposed in respective lead-connection planes at opposite sides of the assembly as viewed in the drawing.

Interconnection of one or more leads at one edge of the circuit modules to counterpart leads at the other edge of the modules is established by lead-connecting conductors disposed in the lead-connection planes and connected to selected ones of the feed-through conductors of the interleaved conductor-containing elements.

Connection of one or more of the leads of the circuit modules to the output pins is established by yet other lead-connection conductors in the lead-connection planes by connection to one or more of the output conductors of one or more of the flat-pack conductor-containing elements.

By virtue of such assemblage of modular components, a high degree of flexibility is afforded, inasmuch as the slotted base member may be pre-formed in relatively long lengths and cut to size according to need; location of the lead-connecting conductors in groups within two parallel planes affords an opportunity for automating the making of electrical joints between such conductors and the leads from the component modular elements; and the interleaved array of flat-pack circuit modules and flat-pack conductor-containing elements affords a high degree of compactness.

By elimination of one or more of the flat-pack conductor-containing elements or flat-pack circuit modules, space can be provided for disposition of discrete microminiature electrical components interpositioned between the microcircuit modules.

Other objects, features, and advantages of the invention will become apparent from the following detailed description of an illustrative embodiment thereof when taken in connection with the accompanying drawings, in which.

Figure 1:
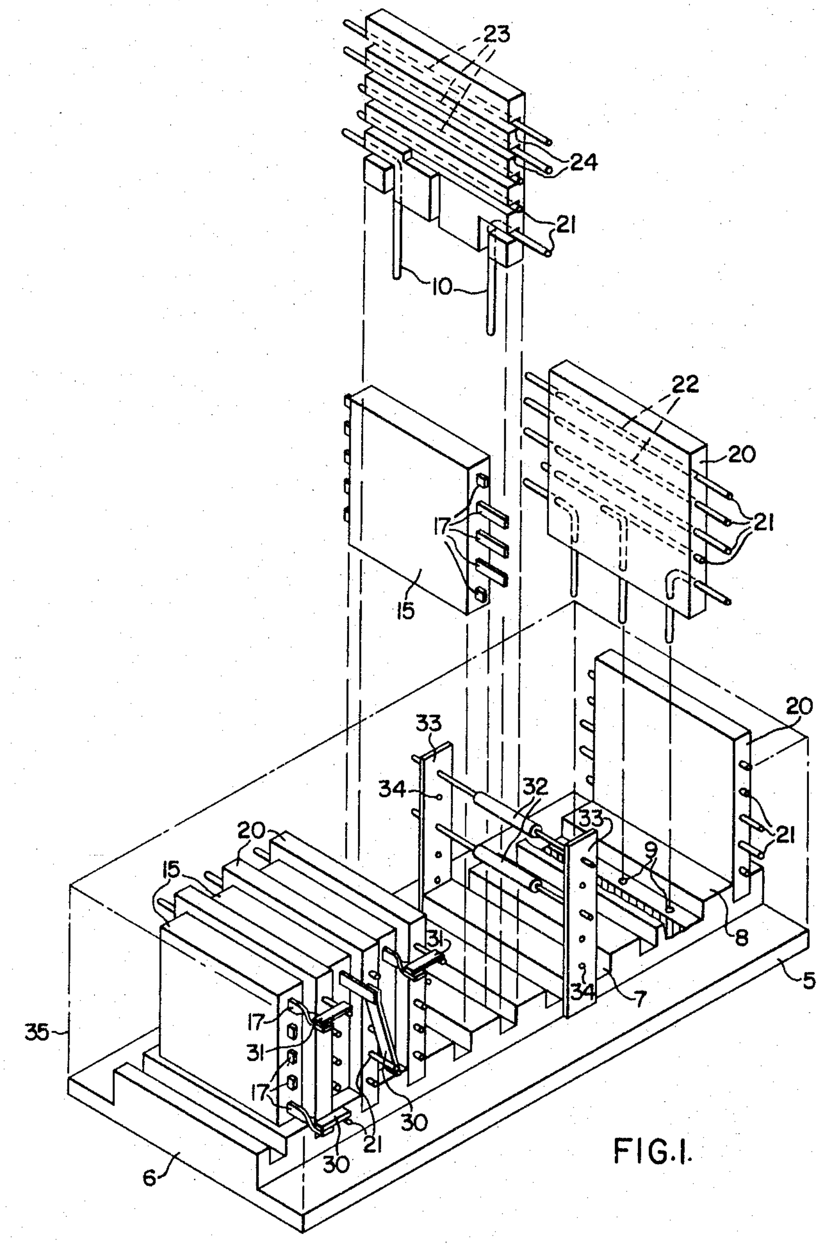
FIGURE 1 is an isometric view of a partially-assembled circuit assembly embodying the invention, with certain parts exploded to facilitate understanding of the construction of such assembly.

Referring to the drawings, the novel assemblage of the present invention comprises a pre-formed base member 5 of substantially flat thin configuration having a generally-rectangular raised portion 6 extending along the length of the base member and projecting perpendicular with respect to one face thereof. Such raised portion includies a plurality of equal-sized locating slots 7 formed therein at regular intervals along its length between which is formed a plurality of equal-sized rectangular shoulders or lands 8. Each of the slots 7 is provided at its bottom with pre-formed holes 9 for accommodating output pins 10 of the assembly, as will be described hereinafter. The initial length of the base member 5 may be longer than ultimately required, and excess length of such base member may be removed following assemblage of components thereon.

The required number of flat-pack microcircuit modules 15 are added to the base member 5 by bonding a thin non-lead side edge thereof onto a series of the mutually adjacent lands 8 of the base member so as to obtain disposition of leads 17 on such modules in parallel arrays extending perpendicular to the base member 5 and spaced apart longitudinally therealong.

Flat-pack conductor-containing elements 20 of this square or rectangular configuration substantially similar to that of the circuit modules 15, are then prepared as by removal of effective portions of the unneeded leads 21 from molded-in-place conductors 22, or by addition of cemented-in-place conductors 23 disposed in pre-formed grooves 24, and such conductor-containing elements 20 are then inserted into the slots in the base member for interposition between the flat-pack circuit modules 15. The used leads 21 of the conductors 22 or 23 of the conductor-containing elements 20 are such as to afford projection at opposite side edges of the assembly in parallel with the leads 17 of the circuit modules 15 mounted on the lands 8. At the same time, certain of the conductors 22 or 23 of the conductor-containing elements 20 extend widthwise through such elements to constitute feed-through conductors which provide for connection of leads 17 at one side of the circuit modules selectively with selected one of leads 17 at the opposite side of the circuit modules. Other of the conductors 22 or 23 of the conductor-containing elements 20 extend downwardly, as viewed in the drawing, through a bottom edge of such elements as the output pins 10 which project through the pre-formed holes 9 in the bottom of the slots 7 in the base member 5. All of the flat-pack circuit modules 15 and the interleaved conductor-containing elements 20 are cemented in place to prevent their becoming disarranged during subsequent steps of the fabrication of the assembly.

Following assemblage of the required number of flat-pack circuit modules 15 and intermediate conductor-containing elements 20 onto the base member 5, connection of selected ones of the circuit module leads 17 to such as an output pin 10 extending outwardly from the bottom of the base member 5 is obtained by soldering or welding a lead-connecting conductor 30 between such selected circuit module lead and an appropriate one of the adjacent leads 21 of the adjacent flat-pack conductor-containing element 20. Connection of a selected one or ones of the circuit module leads 17 at one side of the assembly can be established to a selected circuit module lead or leads 17 at the opposite side of the assembly by soldering or welding lead-connecting conductors 31 for extension between such selected circuit module leads 17 and selected ones of the feed-through conductor leads 17 adjacent conductor-containing elements 20. All of the lead-connecting conductors 30 and 31 at one side of the assembly, as well as the soldered or welded joints, can lie in a common plane, which greatly facilitates fabrication of the assembly. Also by virtue of such assembly arrangement it is possible to encase the interleaved arrangement of circuit modules 15 and conductor-containing elements 20 in a potting compound while assemblied on the base member 5, machine the opposite side faces of such encapsulated assembly to expose the ends of the leads 17 and 21 to the planar surfaces of the potted assembly and pre-form the interconnection between leads on opposite faces by printed circuit technique, as is a well-known technique.

Inclusion of discrete microminiature components 32, such as resistors, diodes, capacitors etc., can be substituted for one or more of the flat-pack circuit modules 15 where desired. Such components can be arranged geometrically in parallel, as shown in FIG. 1, above a respective land 8 of the base member 5, and find support during assembly by extension of their leads at opposite ends through spaced-apart holes 34 in thin flat plastic support elements 33 bonded to the base member 5 against an edge of the raised portion 6 thereof in which the slots 7 and lands 8 are formed. These discrete-component support elements 33 can be of a standard size to project from the base member to about the same extent as an element 20, for example, and to span the width of one land 8, for example. In addition, the holes 34 may be preformed and corresponding in number and spacing to the leads of the circuit modules. Unused holes 34 may simply be ignored.

Following assemblage of the required number of flat-pack circuit modules 15 and conductor-containing elements 20, together with completion of electrical connections on opposite side faces of the assembly, such assembly will be tested electrically and a potting compound molded around the components and their lead interconnections to form a solid elongated rectangular outline 35 of which the base member 5 forms one wall. Where the potting compound is such as epoxy, this material serves as a suitable heat sink material for conducting heat away from the flat-pack circuit modules 15. Where the encapsulating material may be a form material, heat is conducted away from the flat-pack circuit modules 15 by bonding one or more of their faces to faces of the adjacent elements 20 which, when composed substantially of a material such as a phenolic resin or epoxy, will be capable of transferring heat from the circuit modules to the base member 5, which also will be constructed of a similar heat-conductive material. Following such step of potting the assembled and interconnected flat-pack assembly onto the base member 5, any excess length of such base member 5 may be cut off to suit the length of the potted components.

The final configuration of the completed assembly is in the form of solid of rectangular cross-section, with the base member through which the output pins 10 extend forming one longitudinal face thereof and the solidified potting compound defining the other five faces of such assembly.

The width of the base member 5 is such as will afford encapsulation of the components, including the leads 17 and 21 of circuit modules 15 and spacer elements 20, as well as any lead-connecting conductors 30 and 31.

Figure 2:
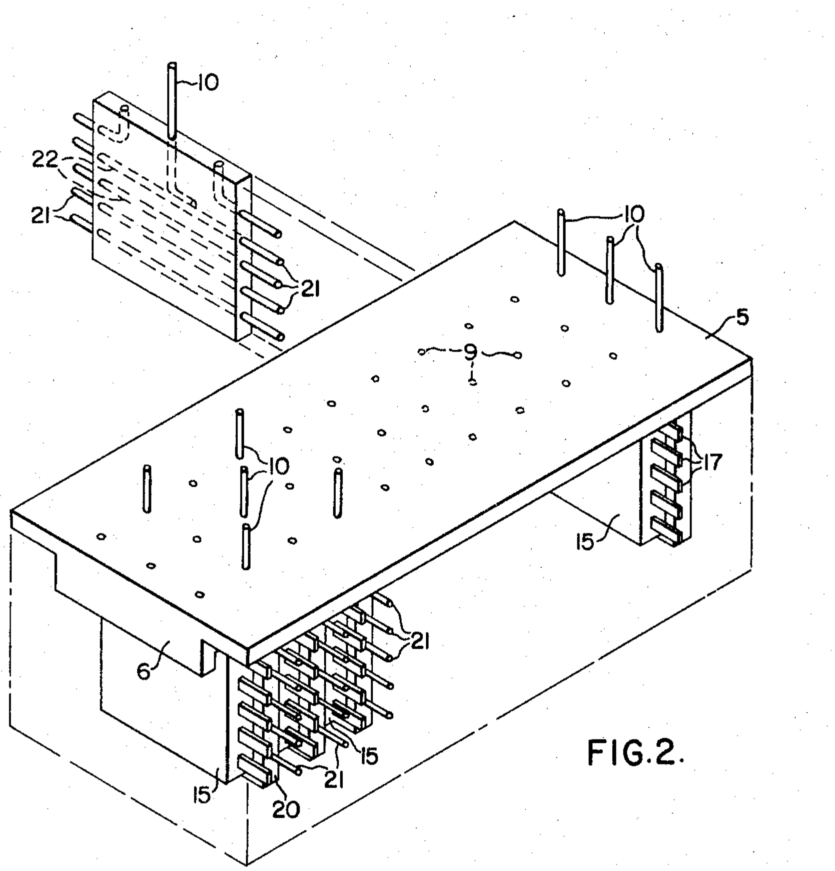
FIG. 2 is an inverted view of the assembly shown in FIG. 1.

For assembling circuit modules of a flat-pack configuration approximately ¼ inch square and about $\frac{1}{16}$ inch thick, the elements 20 may be somewhat thinner and of slightly larger size to project somewhat beyond the outline of the average-sized flat-pack circuit module 15, as may be seen in the exemplification shown in FIGS. 1 and 2, to enable a standard-sized element 20 to be used with a range of circuit module sizes.

Similarly, the dimensions of the lands 8 are somewhat oversized with respect to the edge dimensions of an average-sized flat-pack circuit module to enable accommodation of a range of circuit module edge dimensions.

In the drawings, the side of the assembly as viewed in FIG. 1 shows the unused ones of the flat-pack circuit module leads 17 and of the element leads 21 to have been removed, while the side of the assembly exposed to view in FIG. 2 includes such leads which will be unused and removed as fabrication progresses and lead-connecting conductors are added.

Figure 3:
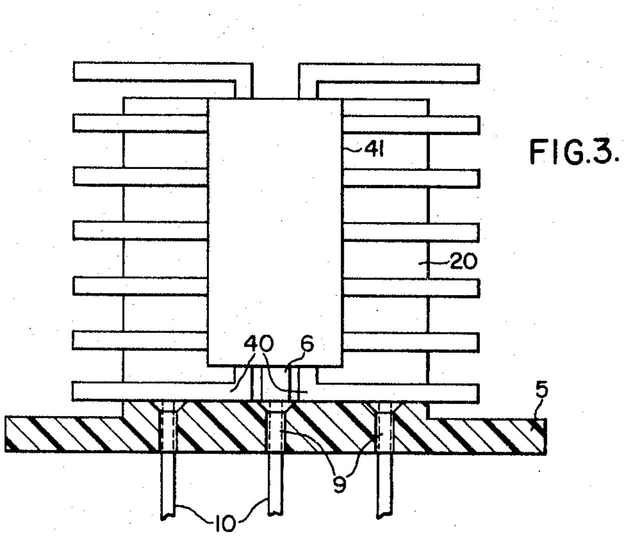
FIG. 3 is an end view of an alternate construction of the base member embodied in the present invention, particularly suited for accommodating microcircuit modules having dual leads exiting at the bottom.

In the alternate embodiment shown in FIG. 3, the construction of the base member 5 is modified to the extent that the raised portion 6 containing the locating slots 7 is relatively narrow to enable being straddled by a pair of right-angled leads 40 at the bottom of an alternate flat-pack microcircuit module 41 construction, such as the fourteen-lead module shown in FIG. 3. While the FIG. 3 base configuration is suited for accommodation of such a bottom-lead-including flat-pack module it can be used to accommodate the non-bottom-lead-including modules shown in FIGS. 1 and 2. In view of such added flexibility in use with different flat-pack module constructions, the configuration of the base member 5 of FIG. 3 would seem to be preferred to that of FIGS. 1 and 2. As to use with a bottom-lead-including flat-pack microcircuit module, the height of the raised slot-defining portion 6 is such as cooperates with the lower edge of the circuit-encapsulating housing of the module and enables the right-angled bottom leads 40 to extend laterally of the base member with clearance. By the straddling of the narrow rib 6 in FIG. 3 by right-angled bottom leads 40, a module such as 41 is easily located along the centerline of the base member 5 during fabrication of the circuit assembly of the present invention.

In the FIG. 1 and 2 base member configuration, however, the elongated slots 7 aid in guiding the output pins 10 of the elements 20 into the pin holes 9 at the bottom of such slots during assembly. As a further assist in this regard, the base member 5 in either configuration could be tapered in the vicinity of the entrance end to the pin holes 9, as indicated in FIG. 3.

It will be apparent that the embodiment of the invention shown and described in the foregoing is exemplary and that various modifications can be made in the construction and arrangement within the scope of the invention as defined in the appended claims.

I claim as my invention:

1. A flat-pack circuit modules assembly comprising an elongated thin rectangular base member of heat-conductive material, said base member having means on one face thereof defining a series of parallel-arranged locating slots extending transversely of such face and disposed along said base member, said base member also having a plurality of preformed pin-accommodating holes at corresponding spaced-apart locations in each of the aforesaid slots which extend from the slot bottoms through the base member; a plurality of flat thin rectangular conductor-containing elements substantially of heat-conducting electrically-insulating material in edgewise-inserted position in respective ones of said locating slots and bonded to said base member, said flat thin rectangular conductor-containing elements each having a plurality of discrete corresponding electrical conductors disposed therein in a common plane with leads therefrom extending in spaced-apart array at respective locations along the opposite parallel thin side edges of each element and certain of which conductors also are joined to output pins projecting from the thin slot-mounted bottom edge of each element through respective ones of the pin-accommodating holes in the base member; a plurality of flat-pack microcircuit modules of thin rectangular shape having a plurality of parallel spaced-apart leads extending through each of opposite parallel thin edges thereof, said flat-pack microcircuit modules being interleaved between said conductor-containing elements such that the arrays of microcircuit module leads and conductor-containing element leads are mutually interposed and each having at least one face thereof in heat-conductive affiliation with a face of an adjacent one of said conductor-containing elements; a first plurality of lead-connecting conductors extending in a first common plane between selected leads at one side of the array of interleaved flat-pack microcircuit modules and conductor-containing elements; a second plurality of lead-connecting conductors extending in a second common plane between selected leads at the opposite side of such array; and potting means extending from the slot-provided face of said mounting base and otherwise surrounding the components of the above-defined circuit assembly.

2. In a flat-pack circuit modules assembly, the combination of an elongated thin rectangular base member having means on a component mounting face thereof defining a series of alternate slots and lands disposed therealong and extending transversely thereof, the bottoms of said slots having pin-accommodating holes extending through said base member; a plurality of flat-pack microcircuit modules disposed in parallel array along the length of said component mounting face and in abutment with respective ones of said lands, said modules each having an array of equally-spaced leads extending outwardly along a thin edge thereof which extends perpendicularly of said lands; a plurality of thin flat rectangular conductor-containing elements interposed in parallel array between said microcircuit modules and in edgewise extension into said slots, said conductor-containing elements having discrete corresponding conductors disposed therein in a common plane with leads therefrom extending outwardly from respective end edges of such elements in parallel aligned relationship with the leads of said microcircuit modules and certain of said conductors also having output pins extending from the respective slot-mounted edges of such elements which project through said pin-accommodating holes in said base member; and a plurality of lead connector conductors electrically connecting selective ones of the aforesaid leads together.

3. The assembly as set forth in claim 2, further characterized by the mounting base and the conductor-containing elements being constructed of heat-conductive material; adjacent faces of the microcircuit modules and of the conductor-containing elements being bonded together for effective heat conduction therebetween; and by inclusion of a foamed-type potting material having relatively poor heat-conductive property surrounding the components mounted on said base.

4. In a flat-pack circuit modules assembly, the combination of an elongated thin rectangular base member having a component mounting face thereon and an array of parallel rows of pin-accommodating holes extending from said mounting face through said base member; a plurality of flat thin conductor-containing elements each having discrete corresponding conductors disposed in a common plane with output pins extending from a bottom edge portion of the element through the pin-accommodating holes of a respective row of such holes and with electrical leads extending from another side edge portion of the element in spaced-apart array in a direction perpendicular to such mounting face; a plurality of flat-pack microcircuit modules disposed between said conductor-containing elements and each having a plurality of leads in a side edge thereof in spaced-apart array extending parallel to the array of leads of said conductor-containing elements; and lead-connecting conductor means electrically joining leads of the microcircuit modules selectively with leads of the conductor-containing elements.

5. The circuit assembly of claim 4, further characterized by means on said base member disposed adjacent to the mounting-face ends of said pin-accommodating holes effective to facilitate insertion of the output pins of said conductor-containing elements during assembly.

6. The assembly set forth in claim 4, further characterized by a face of said flat-pack microcircuit module being bonded to a face of said conductor-containing element.

7. The flat-pack circuit modules assembly of claim 4 further comprising raised portions on said base member disposed between said rows of pin-accommodating holes so located as to accommodate extension of said conductor-containing elements edgewise therebetween.

8. The flat-pack circuit modules assembly of claim 4, wherein each of said flat-pack microcircuit modules also has a pair of centrally-located L-shaped leads extending downwardly from its bottom edge and sidewardly parallel to the other aforesaid leads of the modules, and narrow segmented ribs on said base member projecting upwardly from said mounting face and extending longitudinally therealong which are straddled by said L-shaped leads, which abut the lower edges of said flat-pack microcircuit modules, and between lower edges of said conductor-containing elements are disposed in abutment with the aforesaid mounting face of said base member.

References Cited by the Examiner

UNITED STATES PATENTS

| | | | |
|---|---|---|---|
| 3,020,451 | 2/1962 | McAdam. | |
| 3,029,495 | 4/1962 | Doctor | 317—101 X |
| 3,184,649 | 5/1962 | Singletary | 317—101 |

ROBERT K. SCHAEFER, *Primary Examiner.*

M. GINSBURG, *Assistant Examiner.*